US006651187B2

United States Patent
Lacey, III

(10) Patent No.: US 6,651,187 B2
(45) Date of Patent: Nov. 18, 2003

(54) SYSTEM AND METHOD FOR DETERMINING FAULT PATH BEHAVIOR

(75) Inventor: Herbert Lyvirn Lacey, III, Garner, NC (US)

(73) Assignee: GlobespanVirata Inc., Red Bank, NJ (US)

(*) Notice: Subject to any disclaimer, the term of this patent is extended or adjusted under 35 U.S.C. 154(b) by 73 days.

(21) Appl. No.: 09/683,752

(22) Filed: Feb. 11, 2002

(65) Prior Publication Data

US 2003/0126505 A1 Jul. 3, 2003

Related U.S. Application Data

(60) Provisional application No. 60/343,204, filed on Dec. 31, 2001.

(51) Int. Cl.[7] .................................................. G06F 11/00
(52) U.S. Cl. ........................... 714/38; 714/41; 717/135; 703/22
(58) Field of Search ............................. 714/38, 41, 43; 717/124, 135; 703/22

(56) References Cited

U.S. PATENT DOCUMENTS

| | | | |
|---|---|---|---|
| 5,671,352 A | * 9/1997 | Subrahmaniam et al. | ..... 714/41 |
| 5,699,547 A | 12/1997 | Sato et al. | |
| 5,751,941 A | 5/1998 | Hinds et al. | |
| 6,002,871 A | * 12/1999 | Duggan et al. | .............. 717/135 |
| 6,110,218 A | * 8/2000 | Jennings | ........................ 703/22 |
| 6,192,287 B1 | 2/2001 | Solomon et al. | |
| 6,208,616 B1 | 3/2001 | Mahalingam et al. | |
| 6,249,755 B1 | 6/2001 | Yemini et al. | |
| 6,269,330 B1 | 7/2001 | Cidon et al. | |
| 6,370,606 B1 | 4/2002 | Bonola | |
| 6,381,604 B1 | 4/2002 | Caughran et al. | |
| 6,384,843 B1 | 5/2002 | Harel | |
| 6,477,471 B1 | * 11/2002 | Hedstrom et al. | ............. 702/34 |
| 6,539,503 B1 | * 3/2003 | Walker | ........................ 714/703 |
| 6,557,120 B1 | * 4/2003 | Nicholoson et al. | ........... 714/38 |
| 2003/0093773 A1 | * 5/2003 | Reed et al. | .................. 717/135 |

FOREIGN PATENT DOCUMENTS

EP      1094391 A1  *  4/2001      ......... G06F/11/267

OTHER PUBLICATIONS

Carreira et al. Assessing the Effects of Communication Faults on Parallel Applications. Apr. 24–26, 1995. Proceeding of IPDS'95, International Computer and Dependability Symposium.*

* cited by examiner

Primary Examiner—Robert Beausoliel
Assistant Examiner—Yolanda L. Wilson
(74) Attorney, Agent, or Firm—Hunton & Williams LLP

(57) ABSTRACT

A system and method for determining fault path behavior in a computer software system. An error or event, the occurrence of which is to be tested, is assigned a probability value and an array of elements populated by pseudo-random numbers. Upon each operation of the system under test the current array value is compared against the probability value. If the current array value is greater than or equal than the probability value, the error or event is simulated within the software. Otherwise, the event is not simulated and the software is left to operate conventionally. The array is incremented upon each occurrence of the system under test.

21 Claims, 3 Drawing Sheets

SYSTEM AND METHOD FOR DETERMINING FAULT PATH BEHAVIOR

CROSS REFERENCE TO RELATED APPLICATIONS

This application claims the benefit of U.S. provisional patent application Serial No. 60/343,204 filed Dec. 31, 2001, the disclosure of which is incorporated herein by reference.

BACKGROUND OF THE INVENTION

The present invention relates to data processing systems, and more particularly to systems and methods for developing and debugging software programs implemented by such systems. During the development of computer software programs, it is typically necessary to continually evaluate and test the program to ensure that it will operate properly under a variety of operational conditions. In conducting such testing (commonly referred to as "debugging"), it is often desirable to obtain performance information generated during the actual execution of the program. This information may include timing information relating to execution time of various parts of the program being tested as well as information relating to the program's ability to operate correctly in response to a wide variety of conditions and errors. Preferably, performance information is obtained by monitoring program execution under situations that simulate, as nearly as practical, the actual operating environment in which the software is intended to run. The data gathered during this monitoring (commonly referred to as "tracing") is then analyzed to locate the corresponding places in the code that may be causing or contributing to any identified problems.

In one particular example of software program debugging, it is foreseen that, in operation, a software program should appropriately respond to erroneous inputs or other types of fault sequences such that the error condition is overcome in a timely manner. That is, the program is developed to include various fault paths which are followed in response to various error conditions. In debugging such functionality within a test program, it is desirable to view the operation or behavior of the fault paths when subjected to the error conditions. It can then be determined, through analysis, whether the test program is reacting properly and timely.

Unfortunately, several problems exist in performing the above type of fault path analysis and debugging operations. First, many software programs must be responsive to a wide variety of error conditions, each requiring a different response or fault path on the part of the program. Second, the error conditions being tested are often very rare in their natural occurrence. Nonetheless, the software must be designed to overcome the eventuality that the error conditions will occur. In these circumstances, it is often difficult to reproduce such error conditions in a manner which affords testing of the program yet does not itself impact the operation of the program.

Conventionally, error conditions or sequences are tested by inducing the condition (through external means or otherwise) during operation of the software. For example, in a peer-to-peer system between two networked devices, erroneous signals or messages may be sent to a device under test. However, actually generating each of the conditions to be tested is extremely time intensive, if possible at all. Alternatively, the condition may be "tested" during program development by examining the software code itself or test running portions of code to determine end-user operation.

Unfortunately, in complex systems in which various software components are designed to react timely with each other, code testing alone is unlikely to provide an accurate picture of how the complete system will respond in operation.

In particular, conventional techniques commonly used to debug reactive systems include numerous deficiencies in that such techniques are generally 1) static, and not dynamic, 2) hard-coded, and not variable, and 3) not probabilistic. Typically a developer debugging a reactive system will make a change in the code running a system at one end of a communications link, which change could force an invalid or out-of-context message to be sent at a certain point in a scenario. This approach is useful for observing the behavior of the system receiving the message, but it is only useful in observing single-shot behavior. For example, in one scenario, conventional debugging techniques enable developers to see what the system does when it receives a bad message one time. However, such static techniques fail to enable the developer to see what will happen in multiple executions of the event path. In addition, with conventional methods, developers cannot see what happens when error conditions appears, go away, and then re-appear after some duration of correct behavior. In this circumstance, it is unclear whether the error handing process is robust enough to handle errors which happen infrequently, interspersed with longer periods of correct operation, and continue to do the job for which it was designed.

Accordingly, there is a need in the art of software development techniques for system and method for analyzing fault path behavior of computer software programs.

Further, there is also a need for a method and system for reproducibly injecting fault sequences into a computer software program to determine the responsive fault path behavior.

SUMMARY OF THE INVENTION

The present invention overcomes the problems noted above, and provides additional advantages, by providing a system and method for determining fault path behavior in a computer software system. An error or event, the occurrence of which is to be tested, is assigned a probability value and an array of elements populated by pseudo-random numbers. Upon each operation of the system under test the current array value is compared against the probability value. If the current array value is greater than or equal than the probability value, the error or event is simulated within the software. Otherwise, the event is not simulated and the software is left to operate conventionally. The array is incremented upon each occurrence of the system under test.

DETAILED DESCRIPTION OF THE INVENTION

Figure 1:
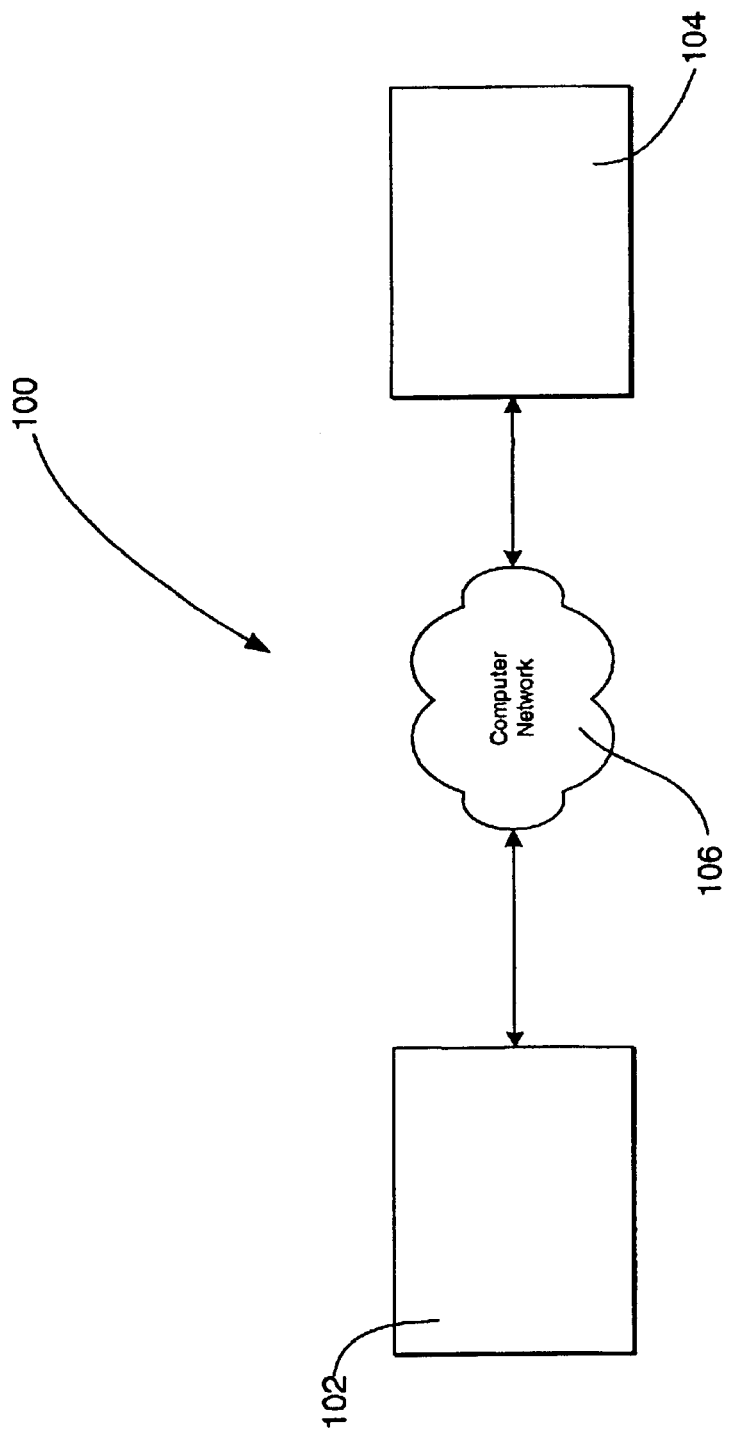
FIG. 1 is a simplified block diagram of one type of computer system for use with the present invention.

Referring to the Figures and, in particular to FIG. 1, there is shown a simplified block diagram of one type of computer system 100 usable with the present invention.

In system 100, a first transceiver system 102 and second transceiver system 104 are remotely connected over a computer network 106. As is understood in the art, transceivers 102 and 104 may comprise any type of computer network device capable of both receiving and transmitting information over the network. Examples of such devices may include modems, routers, etc. Transceivers 102 and 104 typically operate by sending information to each other in the form of data frames or packets, each including a portion of a complete message. Errors between these devices may be caused by packet losses during transmission, out of sequence packets, received frames having bad CRC values, etc.

Figure 2:
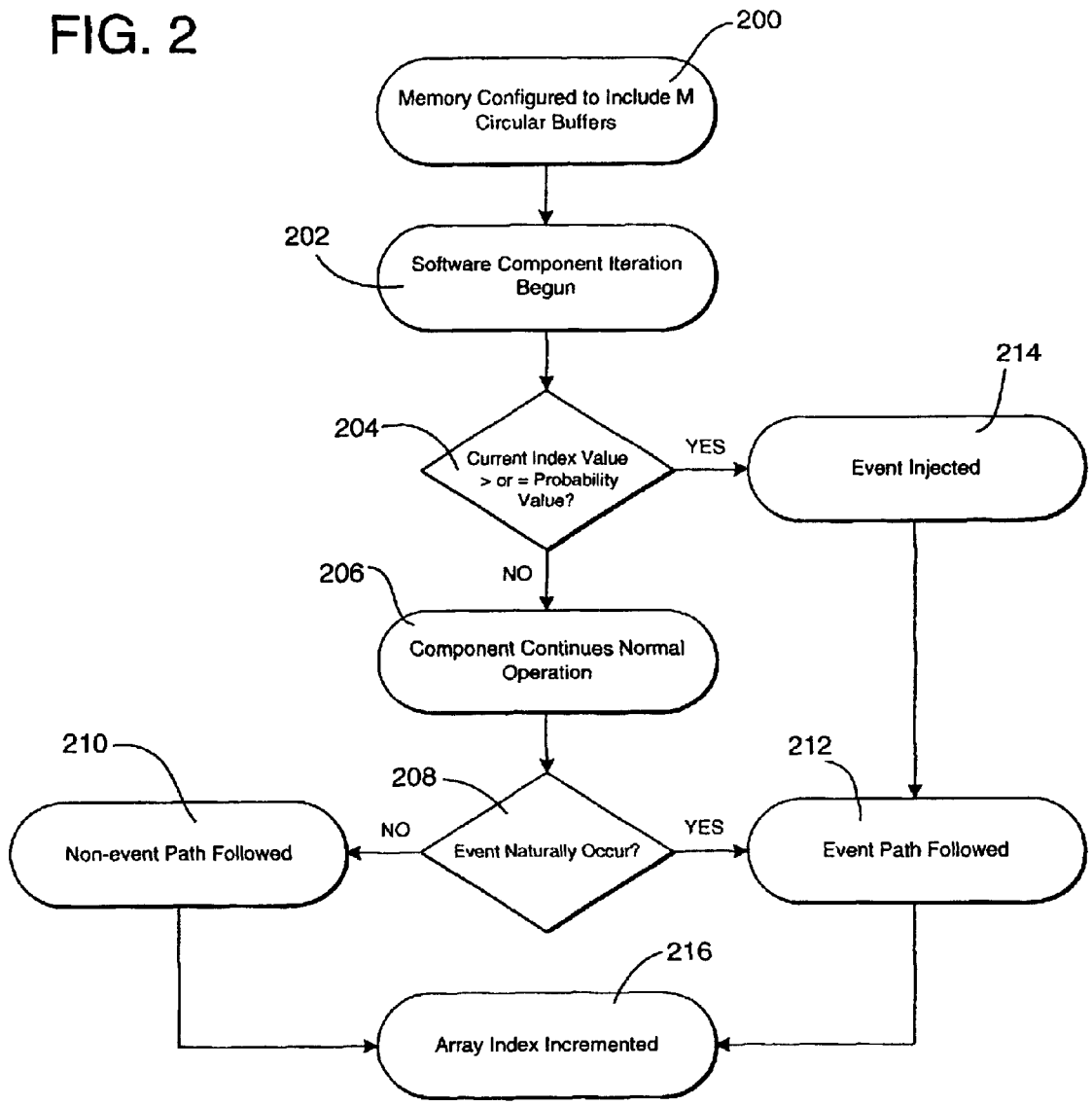
FIG. 2 is a flow diagram illustrating one embodiment of a method for injecting simulated events into a software component.

In accordance with the present invention as set forth in detail below, it is desired to unpredictably, yet reproducibly, test the various components of a computer system for their response to any or all of the above-described errors, as well as any other suitable error conditions or fault sequences without requiring that such error conditions be actually generated. Referring now to FIG. 2, there is shown a flow diagram illustrating one embodiment of a method for injecting M possible simulated events into a software component in accordance with the present invention, where M is an integer value indicative of the number of events under test. Initially, in step 200, a memory associated with the software component is configured to include M circular event buffers, one for each simulated event under test. Further, the event buffers are each configured to include an indexed array populated with N pseudo random numbers less than 100 as well as an event probability value theoretically representative of the probability that the particular event will occur during any one iteration of the software component. However, it should be noted that the event probability value is input by the developer for the purposes of unpredictably injecting the event, and may not actually correlate to any real world probabilities.

In step 202, an iteration of the software component under test is begun. In step 204, an instruction inserted at an appropriate location within the component's code is executed wherein it is determined whether the number located at the current index location in the event array is greater than or equal to the event's probability value. If the current array value is not greater than or equal to the event probability value, operation of the software component continues unmolested (i.e., no simulated event is injected) in step 206. Next, in step 208, the software component determines whether an event has naturally occurred. If not, component follows a non-event path in step 210. However, if an event is identified, an event path is followed in step 212.

Conversely, if it is determined in step 208 that the current array value is greater than or equal to the event probability value, instructions inserted within the component's code are executed at step 214 which force the component to believe that the event in question has occurred. That is, the component is instructed that it has conducted the determination of step 208 and the result indicates that event has occurred. Accordingly, the component is forced to follow the event path in step 212.

Examples of suitable events may include the following: HS_DEBUG_EVT_RX_ERROR_FRAME, wherein the reception of an errored (bad crc) frame is simulated; HS_DEBUG_EVT_TX_ERROR_FRAME, wherein a frame with an error is transmitted to the receiver; HS_DEBUG_EVT_UNEXP_MSG, wherein a valid but unexpected message is sent; HS_DEBUG_EVT_INVALID_MSG, wherein an invalid message (not one of the defined types) is sent; HS_DEBUG_EVT_OT_SUPPORTED, wherein a mode select reception is simulated for an unsupported mode; HS_DEBUG_EVT_NO_TX_SGMT, wherein the case at the transmitter wherein the receiver indicates it does not wish to receive subsequent transmit frames of a multi-frame segmented message is simulated, even though these frames are already queued for transmit; HS_DEBUG_EVT_HIGHER_REV, wherein the reception of a message indicating a higher (more recent) protocol revision than the one in operation is simulated; and HS_DEBUG_EVT_PARSE_ERROR, wherein the reception of a message which, when parsed, generates a parse error is simulated.

Using one of the event examples set forth above or any other suitable event, the instructions at step 212 could indicate to the component under test that a out of sequence message has been received. Accordingly, the component would be directed to its out of sequence event path, which would theoretically respond to such message appropriately. The event path or fault path of the receiving component would then be reviewed and analyzed to determine whether it was appropriate and timely in light of the injected circumstances.

Regardless of whether or not an event has been injected, the index of the event array is incremented in step 216 so that, during the next iteration of the software component, the event once again may or may not be injected. In this manner, the injection of an event or fault is unpredictable, requiring that the software component operate without the foregone knowledge that an event will be injected. Often, analysis of unpredictable fault or event path behavior is a more accurate reflection on the manner in which a software component will respond to such an event in actual operation. By creating the event buffer as a circular buffer, once the process has advanced through each value of the array, the index is returned to the initial value, starting the sequence over again. Such a process may be maintained for each event or fault to be tested.

Figure 3:
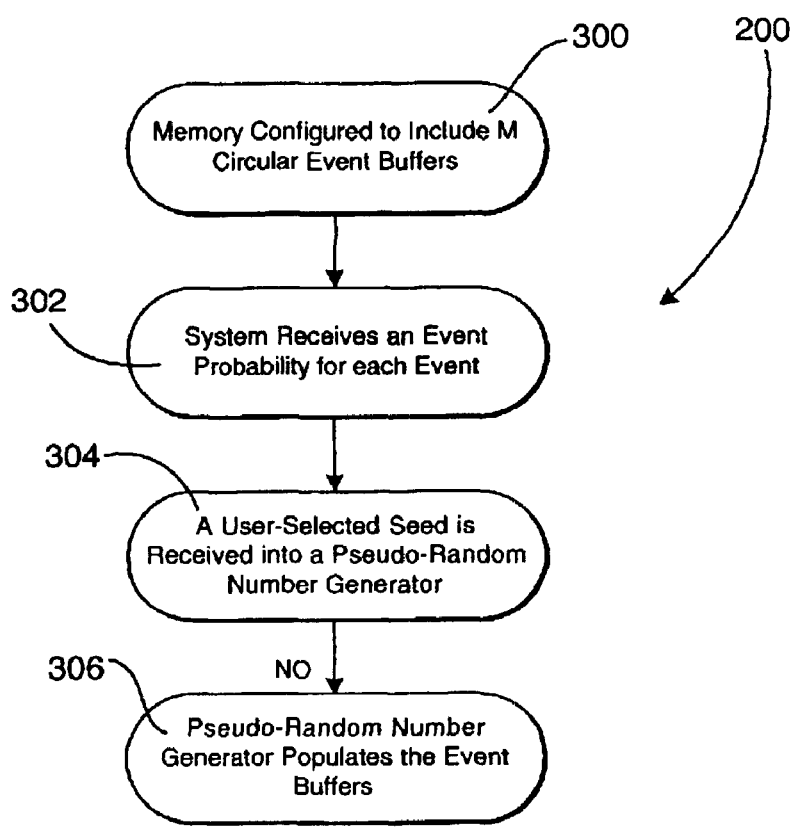
FIG. 3 is a flow diagram illustrating a more detailed embodiment of the circular event buffer configuration step of FIG. 2.

Referring now to FIG. 3, there is shown a flow diagram illustrating a more detailed embodiment of the circular event buffer configuration step (200) briefly set forth above. In step 300, as above, a memory associated with the software component is configured to include M circular event buffers, one for each simulated event under test. Further, the event buffers are each configured to include an indexed array having a length N as well as an event probability value indicative of the likelihood that an event or fault will be injected during a particular iteration of the component. Next, in step 302, a user input of an event probability value is received into the event buffer.

For array values of less than 100, any event probability value over 50 indicates a greater than 50% likelihood that an event will be injected. In step 304, a user-selected seed is received into a pseudo-random number generator. In step 306, the pseudo-random number generator, utilizing the received seed, operates to populate the arrays created in step 300. In one embodiment, the user-selected seed may include the time or date on which the test was run, however, any suitable seed value may be used to generate the pseudo-random numbers. Further, by maintaining a log or other record of the pseudo-random number generator seeds, the developer can reproduce any event sequences generated as a result of the above-described invention. By receiving user information relating to event probabilities as well as pseudo-random number seeds, the present invention enables developers to more specifically tailor their analysis of specific events.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

What is claimed is:

1. A method for determining fault path behavior in a computer software system, comprising the steps of:

configuring a memory to include at least one event buffer corresponding to a error conditions or event, wherein each event buffer includes an array of N numbers, where N is a predetermined integer value and where an incremented array index identifies a particular value in the array;

associating a probability value with each of the at least one event buffers;

running an iteration of a software component under evaluation;

determining if a current array value for a particular event buffer corresponds to the probability value associated with the particular event buffer;

injecting an event into the software component if it is determined that the current array value for the particular event buffer corresponds to the probability value associated with the particular event buffer; and incrementing the array index to advance to the next array value in the array.

2. The method of claim 1, further comprising the step of following an event path within the software component if it is determined that the current array value for a particular event buffer corresponds to the probability value associated with the particular event buffer.

3. The method of claim 1, wherein the step of determining if a current array value for a particular event buffer corresponds to the probability value associated with the particular event buffer, further comprises the step of determining if the current array value for the particular event buffer is greater than or equal to the probability value associated with the particular event buffer.

4. The method of claim 1, wherein the step of configuring a memory to include at least one event buffer corresponding to a error conditions or event, further comprises the steps of:

generating at least one set of N pseudo-random numbers, based upon at least one seed value; and populating the at least one event buffer array with the at least one set of N pseudo-random numbers.

5. The method of claim 4, wherein the at least one seed value is a user-selected seed value.

6. The method of claim 4, further comprising the step of maintaining a log of the at least one pseudo-random number seed values.

7. A method for determining fault path behavior in a computer software system, comprising the steps of:

configuring a memory to include at least one event buffer corresponding to a error conditions or event, wherein each event buffer includes an array of N pseudo-random numbers, where N is a predetermined integer value and where an incremented array index identifies a particular value in the array;

associating a probability value with each of the at least one event buffers;

running an iteration of a software component under evaluation;

determining if a current array value for a particular event buffer is greater than or equal to the probability value associated with the particular event buffer;

injecting an event into the software component and following an event path within the software component if it is determined that the current array value for a particular event buffer corresponds to the probability value associated with the particular event buffer; and incrementing the array index to advance to the next array value in the array.

8. A system for determining fault path behavior in a computer software system, comprising:

means for configuring a memory to include at least one event buffer corresponding to a error conditions or event, wherein each event buffer includes an array of N numbers, where N is a predetermined integer value and where an incremented array index identifies a particular value in the array;

means for associating a probability value with each of the at least one event buffers;

means for running an iteration of a software component under evaluation;

means for determining if a current array value for a particular event buffer corresponds to the probability value associated with the particular event buffer;

means for injecting an event into the software component if it is determined that the current array value for the particular event buffer corresponds to the probability value associated with the particular event buffer; and means for incrementing the array index to advance to the next array value in the array.

9. The system of claim 8, further comprising means for following an event path within the software component if it is determined that the current array value for a particular event buffer corresponds to the probability value associated with the particular event buffer.

10. The system of claim 8, wherein the means for determining if a current array value for a particular event buffer corresponds to the probability value associated with the particular event buffer, further comprises means for determining if the current array value for the particular event buffer is greater than or equal to the probability value associated with the particular event buffer.

11. The system of claim 8, wherein the means for configuring a memory to include at least one event buffer corresponding to a error conditions or event, further comprise:

means for generating at least one set of N pseudo-random numbers, based upon at least one seed value; and means for populating the at least one event buffer array with the at least one set of N pseudo-random numbers.

12. The system of claim 11, wherein the at least one seed value is a user-selected seed value.

13. The system of claim 11, further comprising means for maintaining a log of the at least one pseudo-random number seed values.

14. A system for determining fault path behavior in a computer software system, comprising:

means for configuring a memory to include at least one event buffer corresponding to a error conditions or event, wherein each event buffer includes an array of N pseudo-random numbers, where N is a predetermined integer value and where an incremented array index identifies a particular value in the array;

means for associating a probability value with each of the at least one event buffers;

means for running an iteration of a software component under evaluation;

means for determining if a current array value for a particular event buffer is greater than or equal to the probability value associated with the particular event buffer;

means for injecting an event into the software component and following an event path within the software component if it is determined that the current array value for a particular event buffer corresponds to the probability value associated with the particular event buffer; and means for incrementing the array index to advance to the next array value in the array.

15. A computer readable medium incorporating instructions for determining fault path behavior in a computer software system, the instructions comprising:

one or more instructions for configuring a memory to include at least one event buffer corresponding to a error conditions or event, wherein each event buffer includes an array of N numbers, where N is a predetermined integer value and where an incremented array index identifies a particular value in the array;

one or more instructions for associating a probability value with each of the at least one event buffers;

one or more instructions for running an iteration of a software component under evaluation;

one or more instructions for determining if a current array value for a particular event buffer corresponds to the probability value associated with the particular event buffer;

one or more instructions for injecting an event into the software component if it is determined that the current array value for the particular event buffer corresponds to the probability value associated with the particular event buffer; and one or more instructions for incrementing the array index to advance to the next array value in the array.

16. The computer readable medium of claim 15, further comprising one or more instructions for following an event path within the software component if it is determined that the current array value for a particular event buffer corresponds to the probability value associated with the particular event buffer.

17. The computer readable medium of claim 15, wherein the one or more instructions for determining if a current array value for a particular event buffer corresponds to the probability value associated with the particular event buffer, further comprises one or more instructions for determining if the current array value for the particular event buffer is greater than or equal to the probability value associated with the particular event buffer.

18. The computer readable medium of claim 15, wherein the one or more instructions for configuring a memory to include at least one event buffer corresponding to a error conditions or event, further comprise:

one or more instructions for generating at least one set of N pseudo-random numbers, based upon at least one seed value; and one or more instructions for populating the at least one event buffer array with the at least one set of N pseudo-random numbers.

19. The computer readable medium of claim 18, wherein the at least one seed value is a user-selected seed value.

20. The computer readable medium of claim 18, further comprising one or more instructions for maintaining a log of the at least one pseudo-random number seed values.

21. A computer readable medium incorporating instructions for determining fault path behavior in a computer software system, the instructions comprising:

one or more instructions for configuring a memory to include at least one event buffer corresponding to a error conditions or event, wherein each event buffer includes an array of N pseudo-random numbers, where N is a predetermined integer value and where an incremented array index identifies a particular value in the array;

one or more instructions for associating a probability value with each of the at least one event buffers;

one or more instructions for running an iteration of a software component under evaluation;

one or more instructions for determining if a current array value for a particular event buffer is greater than or equal to the probability value associated with the particular event buffer;

one or more instructions for injecting an event into the software component and following an event path within the software component if it is determined that the current array value for a particular event buffer corresponds to the probability value associated with the particular event buffer; and one or more instructions for incrementing the array index to advance to the next array value in the array.

* * * * *